United States Patent [19]

Schmidt

[11] Patent Number: 5,413,174
[45] Date of Patent: May 9, 1995

[54] SIGNAL TRANSMISSION THROUGH DEFLECTED WELL TUBING

[75] Inventor: Joseph H. Schmidt, Anchorage, Ak.

[73] Assignee: Atlantic Richfield Company, Plano, Tex.

[21] Appl. No.: 245,283

[22] Filed: May 18, 1994

[51] Int. Cl.$^6$ .................. E21B 47/00; G01V 3/26
[52] U.S. Cl. ....................... 166/250; 166/381; 367/35; 367/86
[58] Field of Search .................. 166/250, 381; 367/35, 367/86

[56] References Cited

U.S. PATENT DOCUMENTS

| | | | |
|---|---|---|---|
| 2,137,985 | 11/1938 | Salvatori | 367/86 |
| 2,449,037 | 9/1948 | Harkness | 367/86 X |
| 2,530,308 | 11/1950 | Martin | 367/86 X |
| 3,599,085 | 8/1971 | Semmelisck | 367/86 X |
| 3,876,971 | 4/1975 | Wuenschel | 367/86 |
| 4,578,785 | 3/1986 | Gelfand | 367/35 |
| 4,596,143 | 6/1986 | Norel | 367/35 x |
| 4,706,225 | 11/1987 | Raoult | 367/43 X |
| 4,766,577 | 8/1988 | Clerke et al. | 367/35 X |
| 5,180,011 | 1/1993 | Wittrisch | 166/250 |
| 5,318,129 | 6/1994 | Wittrisch | 166/250 X |

Primary Examiner—Ramon S. Britts
Assistant Examiner—Frank S. Tsay
Attorney, Agent, or Firm—Michael E. Martin

[57] ABSTRACT

Fluid production or injection wells may be used to transmit or receive seismic signals by lowering a signal transmitting device within a tubing string disposed in the well and exerting a pressure fluid force on a free bottom end of the tubing string to cause the tubing string to helically deflect within the well and engage the wellbore wall firmly over a large portion of the tubing string to enhance the quality and intensity of the signal transmitted between the transmitting device and the earth formation penetrated by the well.

8 Claims, 1 Drawing Sheet

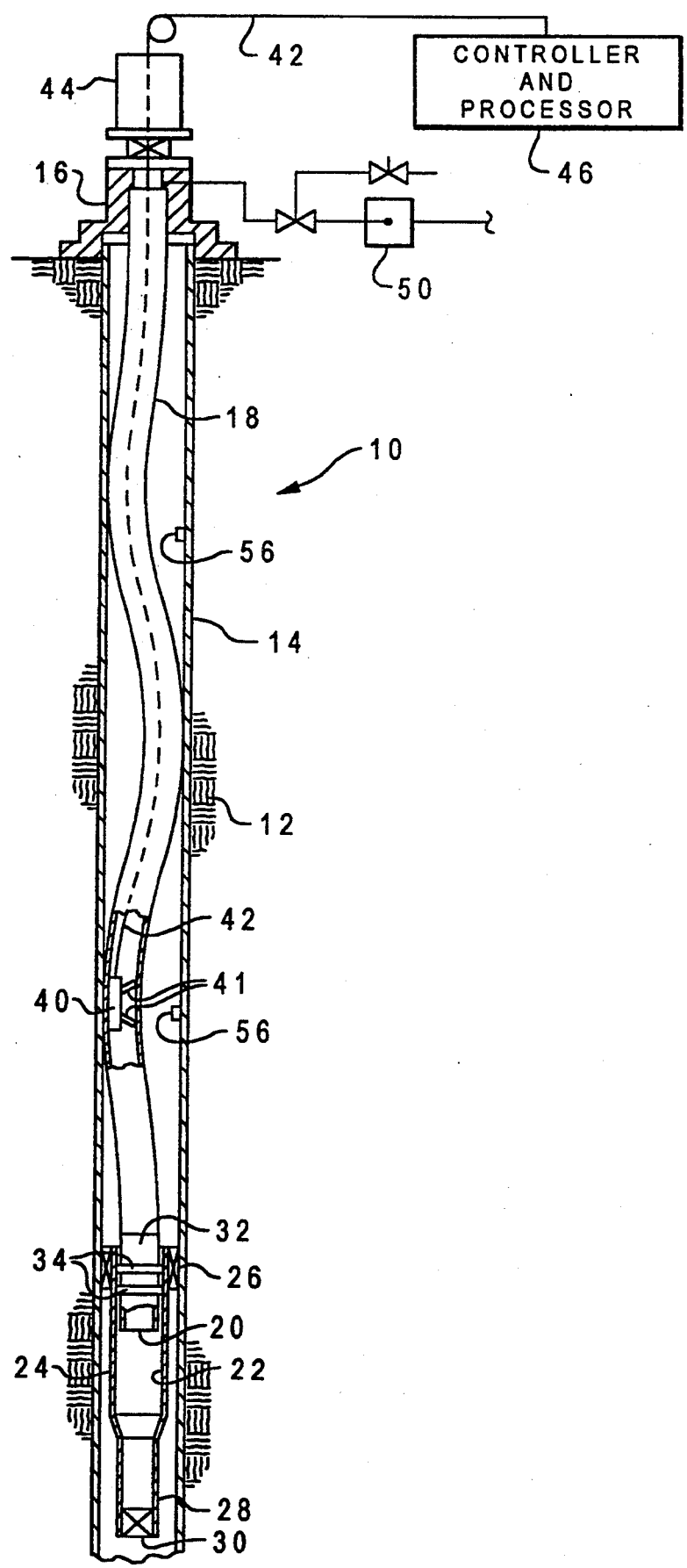

SIGNAL TRANSMISSION THROUGH DEFLECTED WELL TUBING

BACKGROUND OF THE INVENTION

1. Field of the Invention

The present invention pertains to a method for obtaining improved seismic signal transmission through a well tubing wherein the tubing is deflected into engagement with a well casing or wellbore wall by a pressure force acting on a longitudinally displaceable end of the tubing.

2. Background

In many exploration and development operations in connection with the production of oil and gas from subterranean earth formations, it is necessary to transmit seismic and certain other types of signals between the earth formation and a sensor disposed in a well. For example, one exploration and development technique, commonly known as VSP, or vertical seismic profiling, is carried out by placing a seismic signal source or a seismic signal sensor at various depths in a well for transmitting or receiving signals through an earth formation surrounding the well. In other operations such as in hydraulically fracturing earth formations, it is desirable to monitor the growth and direction of extension of a fracture by placing seismic sensors in so-called monitor wells which are somewhat in proximity to the injection well.

One problem associated with signal transmission by way of a signal generating or receiving device disposed in a wellbore is the development of firm physical contact between the device and the wellbore wall. In certain operations, it may be desirable to place the signal generator or receiver device within an elongated tubing string extending within the well. However, it is difficult to place this tubing string in firm contact with the wellbore wall, including a casing or liner, so that a high quality signal path is provided between the device and the earth formation surrounding the well. The present method provides a unique solution to this problem which is applicable to certain signal transmission efforts when the signal generating or receiving device is to be placed within a tubing string extending within a well.

SUMMARY OF THE INVENTION

The present invention provides an improved method for transmitting signals between a wellbore and an earth formation wherein a signal transmitter device (generator or receiver) is disposed within a tubing string which is deflected into firm engagement with the wellbore wall, which may include a casing defining such wellbore wall.

In accordance with an important aspect of the present invention, a method for transmitting signals between a signal transmitting device and an earth formation is provided wherein an elongated tubing string extending within a well is subjected to pressure fluid forces to effect deflection of the tubing string into firm engagement with the wellbore wall whereby the signal transmitting device, which is disposed in the tubing string, is operable to receive signals such as acoustic signals from an earth formation for transmission to the surface through a suitable transmission path. Conversely, the signal transmitting device may operate to generate a signal for transmission through the tubing wall and the wellbore wall into the earth formation.

The tubing string is adapted to have a substantially free end disposed in a sealed bore which is exposed to pressure fluid and results in a net pressure fluid force exerted on the free end of the tubing string to displace the tubing string generally upwardly, in a vertical well, to effect elastic deflection of the tubing string into firm engagement with the wellbore wall. Conventional wellbore tubing will undergo a substantially helical type deflection which will provide for firm engagement of the tubing string substantially throughout its length between the wellhead or a point of anchor of the tubing string and the end which is disposed in the sealed bore.

The invention provides improved means for transmitting acoustic signals, for example, to a seismic signal sensor disposed in a tubing string whereby improved signal transmission and clarity is obtained since the tubing string is firmly biased into engagement with the wellbore wall, which may comprise a well casing, or a so-called open hole portion of the wellbore. Thanks to the unique method of deflecting the tubing string into engagement with the well, improved signal transmission characteristics are obtained between a signal transmitting device and an earth formation penetrated by the well.

Those skilled in the art will recognize the above-described features and advantages of the invention, together with other superior aspects thereof, upon reading the detailed description which follows in conjunction with the drawing.

BRIEF DESCRIPTION OF THE DRAWING

The drawing figure is a somewhat schematic diagram illustrating a well in which a tubing string has been deflected for enhancing signal transmission in accordance with the method of the present invention.

DESCRIPTION OF A PREFERRED EMBODIMENT

In the description which follows, like elements are marked throughout the specification and drawing with the same reference numerals, respectively. The drawing figure is not intended to be to scale in the interest of clarity and conciseness.

Referring to the drawing figure, there is illustrated a well 10 penetrating an earth formation 12. The well 10 includes a suitable casing 14 which has been installed in accordance with conventional techniques and is in firm contact with the earth formation 12, either directly or through an intermediate layer of cement, not shown, in accordance with conventional well construction practice. A conventional wellhead 16 is shown disposed on the surface of the earth formation 12 and is adapted to support an elongated tubing string 18 which extends within the casing 14. A so-called free distal end 20 of the tubing string 18 extends within a bore 22 of a so-called seal bore extension member 24 which extends within the casing 14 from a conventional packer 26. The bore member 24 is connected to a tubing tail section 28 which includes or comprises a suitable landing nipple member adapted to receive a retrievable fluid tight plug 30 indicated somewhat schematically in FIG. 1. The member making up the distal end 20 of the tubing string 18 may comprise a so-called tubing seal nipple 32 having one or more resilient annular seal members 34 formed thereon and operable to be in substantially fluid tight sealing engagement with the bore 22 of the seal bore extension member 24 but slidable therewithin. The tubing string 18 is made up of conventional wellbore tubing members and the elements comprising the seal bore extension member 24, the packer 26, the landing or no-go nipple 28, the plug 30 and the tubing seal member 32 are commercially available from sources such as Baker Hughes Company, Houston, Tex. or Halliburton Company, Dallas, Tex.

The drawing figure also illustrates an acoustic signal transmitting device 40 disposed at a predetermined position within the tubing string 18 and connected to an elongated cable 42, commonly known as a wireline, which extends from a conventional wellhead supported lubricator 44 within the tubing string 18 and is operable to traverse the transmitting device 40 within the tubing string and also conduct electrical signals between the transmitting device and a suitable controller and signal processor 46. The signal transmitting device 40 may be of a type commercially available and includes suitable mechanism 41 comprising retractable legs for firmly biasing the signal transmitting device against the wall of the tubing 18. When the mechanism 41 is in a "retracted" position the transmitting device 40 may be traversed through the tubing string at will. The signal transmitting device may comprise a set of geophones for receiving acoustic signals from the earth formation 12 transmitted through the casing 14 and the wall of the tubing string 18. Conversely, the signal transmitting device 40 may comprise a signal generator operable to transmit acoustic or other types of signals through the tubing wall 18, the casing 14 and into the earth formation 12. Those skilled in the art will recognize that the casing 14 may not be required in order to practice the method of the present invention and the tubing string 18 may be operable to engage the open hole well wall comprising the earth formation itself or some other structure, not shown, forming the wellbore wall.

In order to form a suitable signal transmission path for the device 40, it is desirable that the tubing string 18 be firmly engaged with the wellbore wall. In accordance with the present invention, this is carried out by exerting a pressure fluid force on the distal end 20 of the tubing string 18 to push upward on the tubing string, viewing the drawing figure, and causing the tubing string to undergo lateral deflection. Pressure fluid may be supplied by way of a pump or compressor 50 to the wellhead 16 for conduction down through the tubing string 18 itself. Accordingly, in order to apply a sufficient pressure fluid force against the effective transverse area of the distal end 20 of the tubing string 18 without conducting the same pressure fluid into the wellbore below the packer 26, the retrievable plug 30 may be inserted in the nipple 28 through the tubing string itself, for example. Pressure of fluid in the tubing string 18 and the bore 22 is then increased to cause a net axially applied force to the distal end 20 of the tubing string 18 to urge the distal end upwardly in the seal bore extension member 24 to deflect the tubing string as illustrated.

As mentioned previously, conventional steel well tubing will undergo substantially elastic and somewhat helically configured deflection within the wellbore. The illustration of the drawing figure is intended to show the tubing 18 having undergone helical deflection into substantially full engagement with the wellbore wall defined by the casing 14, at least throughout one complete helical turn of the tubing string. In many wellbore structures, for example, over the length of the casing which would be, typically, engaged by a tubing string for the purposes of this invention, the casing diameter might be on the order of 9.0 to 10.0 inches and be fabricated of conventional steel materials normally used for well casing. The tubing string 18 over the same portion of the wellbore structure would typically be on the order of 3.50 inches to 4.50 inches in diameter and also be made of conventional steel materials normally used for wellbore tubing and capable of elastic deflection in accordance with the invention.

The method of transmitting signals with the device 40 may be carried out, generally, as follows. With the tubing string 18 in place with its distal end 20 disposed suitably in the seal bore extension member 24 and with only nominal fluid pressure exerted in the tubing string and in the bore 22, the device 40 would be lowered into the tubing string through the lubricator 44, for example, to a predetermined position or within a depth range such that the final position of the device would normally be easily obtained once the tubing string 18 was deflected. The plug 30 is placed in its working position within the nipple 28 prior to lowering the device 40 into the tubing string. With the device 40 in a predetermined position in the tubing string 18, the fluid pressure in the bore 22 is increased by pumping a suitable fluid such as an inert gas through the tubing string 18 to increase the net effective pressure force acting on the distal end 20 causing the tubing string to deflect elastically and helically as indicated in the drawing figure.

Once the tubing string 18 has been suitably deflected into firm engagement with the wellbore wall, the device 40 may be moved, at will, to a working position and the retractable legs 41 extended to lock the device in firm engagement with the inner wall of the tubing. The precise location of the device 40 may be determined by suitable sensing means on the device which could sense locating means in the wellbore such as conventional magnetic casing locator collars 56, for example. Conversely, the device 40 may include suitable sensing means for performing gamma ray logging of the formation 12 in the zone of interest and comparing the logging data to pre-existing logs or other suitable means for determining the exact location of the signal transmitting device 40, depth-wise, in the well 10. Once the position of the device 40 is determined, suitable signal transmission and processing may be carried out in a conventional manner.

Normally, when it is desired to retrieve the device 40 from the tubing 18, the fluid pressure acting on the distal end 20 may be relieved by shutting off the pump or compressor 50 and suitably venting pressure fluid through the conduit system connected to the wellhead 16, as illustrated. The device 40 may be then be retrieved through the well in a conventional manner by retracting the legs 41 and retrieving the device with the conductor cable 42. Upon reduction of the fluid pressure in the seal bore extension member 24, the tubing 18 will relax and tend to become substantially straight or assume the position that the tubing was in before pressure was increased in the bore 22. The seal member 32 will, of course, move further into the bore of the seal bore extension member 24 as the tubing assumes a somewhat straight position within the casing 14 and generally centered along the longitudinal central axis of the wellbore. Accordingly, with the foregoing method, signal transmitting devices may be lowered into a wellbore within a suitable protective tubing string such as the tubing string 18 and easily retrieved from the well while, at the same time, suitable signal clarity and quality may be provided by bringing the tubing string 18 into firm contact with the wellbore wall to enhance the strength of the signal being transmitted to or from the device 40. Accordingly, wells which normally are used for producing fluids from or injecting fluids into the formation 12 may be easily converted for use in receiving or transmitting certain signals at various depths within the well without any major modification to the wellbore structure while still obtaining suitable signal strength and quality.

Although a preferred method in accordance with the invention has been described in detail herein, those skilled in the art will recognize that various substitutions and modifications may be made without departing from the scope and spirit of the appended claims.

What is claimed is:

1. A method for transmitting signals with respect to an earth formation having a well penetrating said formation, comprising the steps of:

placing a signal transmitting device within a tubing string extending within said well;

deflecting said tubing string into firm engagement with a wellbore wall of said well; and transmitting signals between said device and said earth formation through a wall of said tubing string.

2. The method set forth in claim 1 wherein:

said tubing string has a substantially free end extending within said well and said tubing string is deflected by exerting a pressure fluid force on said free end of said tubing string.

3. The method set forth in claim 2 wherein:

said free end of said tubing string extends within a seal bore member disposed in said well and said pressure fluid is conducted into said seal bore member to act on said free end of said tubing string.

4. The method set forth in claim 3 including the step of:

providing a fluid seal in said tubing string prior to exerting said pressure fluid force on said tubing string.

5. The method set forth in claim 3 including the step of:

placing a retrievable plug in a nipple at a distal end of said seal bore member prior to introducing pressure fluid into said seal bore member.

6. The method set forth in claim 1 including the step of:

moving said signal transmitting device within said tubing string to a predetermined position after deflecting said tubing string.

7. A method for transmitting signals with respect to an earth formation having a well penetrating said formation, said well including a tubing string extending therewithin, said method comprising the steps of:

exerting a pressure fluid force on said tubing string to deflect said tubing string into firm engagement with a wellbore wall of said well; and transmitting signals between a device disposed in said tubing string and said earth formation through said tubing string and said wellbore wall.

8. The method set forth in claim 7 wherein:

said tubing string has an end extending within a seal bore member disposed in said well and pressure fluid is conducted into said seal bore member to act on said end of said tubing string to cause said tubing string to deflect into engagement with said wellbore wall.

* * * * *